US010788621B2

(12) United States Patent
Li et al.

(10) Patent No.: US 10,788,621 B2
(45) Date of Patent: Sep. 29, 2020

(54) UV-TRANSPARENT OPTICAL FIBER COATING FOR HIGH TEMPERATURE APPLICATION, AND FIBERS MADE THEREFROM

(71) Applicant: OFS Fitel, LLC, Norcross, GA (US)

(72) Inventors: Jie Li, Unionville, CT (US); Yaowen Li, Princeton, NJ (US); Michael J Hines, Ivoryton, CT (US); Brian Violette, East Granby, CT (US); Lei Huang, Unionville, CT (US); David Burgess, Springfield, MA (US)

(73) Assignee: OFS FITEL, LLC

( * ) Notice: Subject to any disclaimer, the term of this patent is extended or adjusted under 35 U.S.C. 154(b) by 0 days.

(21) Appl. No.: 15/085,646

(22) Filed: Mar. 30, 2016

(65) Prior Publication Data

US 2017/0010411 A1 Jan. 12, 2017

Related U.S. Application Data

(60) Provisional application No. 62/189,574, filed on Jul. 7, 2015.

(51) Int. Cl.
*G02B 6/036* (2006.01)
*G02B 6/02* (2006.01)
*C03C 13/04* (2006.01)
*C03C 17/30* (2006.01)

(52) U.S. Cl.
CPC ........ *G02B 6/02395* (2013.01); *C03C 13/045* (2013.01); *C03C 17/30* (2013.01); *G02B 6/02142* (2013.01); *G02B 2006/02161* (2013.01)

(58) Field of Classification Search
CPC ............ G02B 6/02395; G02B 6/02142; G02B 2006/02161; C03C 13/045; C03C 17/30
USPC .................................................. 385/126–128
See application file for complete search history.

(56) References Cited

U.S. PATENT DOCUMENTS

| 5,381,504 | A |   | 1/1995  | Novack et al. |
|-----------|---|---|---------|---------------|
| 5,620,495 | A | * | 4/1997  | Aspell ................ G02B 6/02142 385/123 |
| 5,745,615 | A |   | 4/1998  | Atkins et al. |
| 5,773,486 | A | * | 6/1998  | Chandross ......... G02B 6/02138 522/14 |
| 5,903,690 | A | * | 5/1999  | Starodubov ............. C03B 32/00 385/37 |
| 5,989,627 | A |   | 11/1999 | Blyler, Jr. et al. |
| 6,204,304 | B1| * | 3/2001  | Houlihan .............. C03C 25/106 359/566 |
| 6,222,973 | B1| * | 4/2001  | Starodubov ........ G02B 6/02104 385/126 |

(Continued)

OTHER PUBLICATIONS

Chao et al.; "Grating writing through fibre coating at 244 and 248nm"; Electronics Letters; vol. 35, No. 11; May 27, 1999, 3 pages.

(Continued)

*Primary Examiner* — Ellen E Kim
(74) *Attorney, Agent, or Firm* — Dave Rodrigues, Esq.

(57) ABSTRACT

An optical fiber having at least two polymer coatings, the optical fiber comprising: an optical fiber comprising a glass optical core and a glass cladding; a first polymer coating comprising a silicone polymer covering the optical fiber; and a second polymer coating covering the first polymer coating is provided.

25 Claims, 3 Drawing Sheets

(56) References Cited

U.S. PATENT DOCUMENTS

| | | | |
|---|---|---|---|
| 6,272,886 | B1 | 8/2001 | Novack et al. |
| 6,396,983 | B1 | 5/2002 | Atkins et al. |
| 6,528,239 | B1 | 3/2003 | Starodubov |
| 6,652,975 | B2 | 11/2003 | Kuck et al. |
| 6,696,157 | B1 | 2/2004 | David et al. |
| 6,959,022 | B2* | 10/2005 | Sandrock .......... C03B 37/01426 372/6 |
| 7,239,785 | B2* | 7/2007 | DeMartino ........... C03C 25/106 385/128 |
| 7,297,731 | B2 | 11/2007 | Walker, Jr. et al. |
| 9,733,444 | B2* | 8/2017 | LeBlanc .............. G02B 6/4432 |
| 2003/0199603 | A1 | 10/2003 | Walker et al. |
| 2008/0260337 | A1* | 10/2008 | Bahadur .............. C03C 25/106 385/123 |
| 2013/0181361 | A1* | 7/2013 | Uehara ................. C08L 83/08 257/788 |
| 2014/0341521 | A1* | 11/2014 | Fabian .................. G02B 6/245 385/128 |
| 2015/0277031 | A1* | 10/2015 | Bookbinder ....... G02B 6/02033 385/115 |
| 2016/0177092 | A1* | 6/2016 | McCarthy .......... C08G 18/4825 522/162 |
| 2017/0204290 | A1 | 7/2017 | Simoff et al. |

OTHER PUBLICATIONS

Espindola et al.; "40 dB Fiber Bragg Grating Written Through the Fiber Coating at 257 nm"; Bragg Gratings, Photosensitivity, and Poling in Glass Fibers and Waveguides: Applications and Fundamentals Topical Meeting; Postdeadline Papers; 1997, 6 pages.

Espindola et al.; "Fiber Bragg Gratings Written Through a Fiber Coating"; OFC Post-deadline Paper; 1997, 4 pages.

Espindola et al.; "Highly Reflective Fiber Bragg Gratings Written Through a Vinyl Ether Fiber Coating"; IEEE Photonics Technology Letters; vol. 11, No. 7, Jul. 1999, pp. 833-835.

Simoff et al.; "Coatings Having Enhanced UV Transparency for the Fabricaton of Optical Fiber Gratings"; International Wire & Cable Symposium Proceedings; 1997, 8 pages.

Simoff et al.; "Cure Studies With Novel Photoinitiators"; Radtech—North America; 1998, 7 pages.

Simoff et al.; "UV-Transparent Coatings for the Fabrication of Optical Fiber Gratings"; Abstracts of Papers of the American Chemical Society; vol. 218. pp. U578-U579 1155 16th St, NW Washington, DC 20036 USA: Amer Chemical Soc; 1999, 6 pages.

* cited by examiner

UV-TRANSPARENT OPTICAL FIBER COATING FOR HIGH TEMPERATURE APPLICATION, AND FIBERS MADE THEREFROM

CROSS-REFERENCE TO RELATED APPLICATIONS

This disclosure claims the benefit of U.S. Provisional Application No. 62/189,574 filed on Jul. 7, 2015, the entire contents of which are hereby incorporated by reference.

BACKGROUND

Disclosed herein are ultraviolet (UV) transparent optical fiber coatings for high temperature applications and the fibers made therefrom.

Fiber Bragg grating (FBG) arrays are seeing increased interest for a variety of applications. FBGs can be fabricated on a polymer coated fiber, using a "strip/write/recoat" process, where the polymer coating is removed from the glass substrate of the fiber, followed by laser inscription of the FBG into the glass optical core, and subsequent recoating to restore mechanical robustness afforded by a protective polymer layer. This "strip/write/recoat" process is time consuming and subjects the stripped fiber to an increased probability of breakage, reducing yields, and manufacturing efficiency.

"Write-through" coating (WTC) methods were developed that allow inscription of gratings by side-writing with UV lasers through the fiber coating using coatings that have increased UV transparency at the writing wavelength. However, such coatings to date have provided only modest levels of robustness with respect to scuff resistance and thermal stability. Some other UV-transparent coatings could be thermally cured and demonstrate superior thermal stability; however, the coated surface has a tacky characteristic, causing significant handling issues during FBG production.

Improved write-through coatings are needed with high thermal stability and improved handling properties.

SUMMARY

Disclosed herein is an optical fiber having at least two polymer coatings, the optical fiber comprising: an optical fiber comprising a glass optical core and a glass cladding; a first polymer coating comprising a silicone polymer covering the optical core; and a second polymer coating covering the first polymer coating.

Also disclosed herein is an optical fiber having at least two polymer coatings, the optical fiber comprised of a glass optical core and a glass cladding; a first polymer coating comprised of a silicone polymer covering and in intimate contact with the glass cladding; and a second polymer coating covering and in intimate contact with the first polymer coating.

"Intimate contact" means two items are sufficiently close to each other that there are no gaps or voids that prevent any desired effect from occurring.

Also disclosed is a method of manufacture of an article having layers, comprising: providing an optical fiber; applying a silicone coating precursor to the fiber; curing the silicone coating precursor, to form a silicone polymer coated fiber; applying a second coating precursor around the silicone polymer coated fiber; curing the second coating precursor, to form a second polymer coating; wherein the polymer coatings have an ultraviolet absorption that is sufficiently low so as to allow one or more optical devices to be inscribed into the fiber, in a post coating process, through the coatings, using an ultraviolet or infrared laser. The one or more optical devices can be inscribed into the optical core of the fiber.

Also disclosed herein is a method of manufacture of an article having layers, comprising an optical fiber; application of a silicone coating precursor to the optical fiber; curing of the silicone coating precursor, to form a silicone polymer coated fiber; application of a second coating precursor around the silicone coated fiber; curing of the second coating precursor, to form a second polymer coating; wherein the polymer coatings have an absorption that is sufficiently low so as to allow one or more optical devices to be inscribed within the core of the fiber during a post coating process, through the coatings, using an ultraviolet or infrared laser.

Also disclosed herein is an optical fiber manufactured by the methods described herein.

The above described and other features are exemplified by the following figures and detailed description.

BRIEF DESCRIPTION OF THE FIGURES

The following Figures are exemplary embodiments.

DETAILED DESCRIPTION

Figure 1:
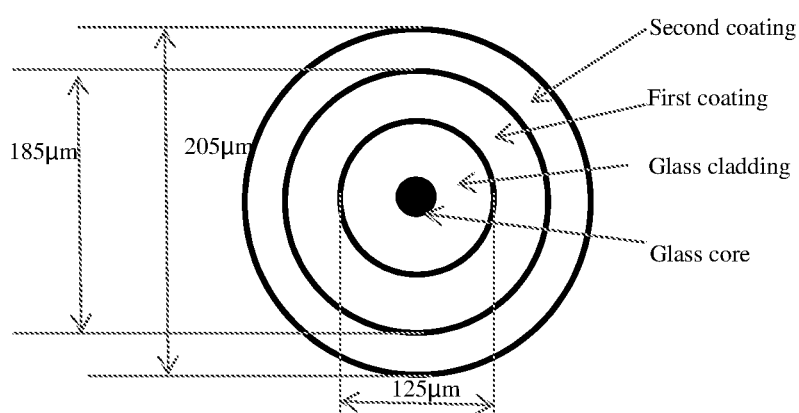
FIG. 1 shows an exemplary fiber cross-section (not to scale)

Disclosed herein are optical fibers having at least two polymer coatings. The polymer coatings are disposed onto optical fibers, preferably glass optical fibers, or onto other optical substrates that can have light-induced, for example UV-induced, or infrared-induced optical devices written into one or more portions within the optical fiber or substrate without removing the polymer coatings, thus permitting high speed manufacturing of mechanically robust fiber gratings. The optical devices can be a grating, preferably a fiber Bragg grating. The optical fiber can comprise a glass optical core and a glass cladding, for example.

The first polymer coating comprises a silicone polymer. Silicone polymers are useful as a fiber coating for harsh environment applications because silicone polymers have a wide range of use temperature (e.g., from −100° C. to 250° C., preferably from −115° C. to 204° C.). However, silicone polymers typically have a tacky surface. This tacky surface causes various handling issues that lead to difficulty in fiber payoff and breakage during FBG production, for example. To minimize these difficulties, a second polymer coating comprising a write-through coating (WTC) is applied. Write-through coatings are generally transparent to UV light (i.e., light having a wavelength of 100 nanometers to 400 nanometers, preferably 200 to 365 nanometers), allowing the UV light to write a desired pattern, such as a grating, onto or into the optical fiber. The ultraviolet radiation may be a combination of ultraviolet A, ultraviolet B, ultraviolet C radiation, or a combination comprising at least one of the foregoing. Other wavelengths of radiation can be used to write a desired pattern onto or into the optical fiber. The use of a WTC as a coating on the silicone polymer improves handling properties because it decreases the tacky nature of the fiber surface. An up-buffer coating can optionally be applied to protect the WTC after the laser inscription (i.e., after a UV-induced device has been formed in the optical fiber). The up-buffer coating can protect the second polymer coating applied and demonstrate wide operating temperature ranges, for example, from −200 to 260° C., as characterized by thermogravimetric analysis (TGA).

The polymer coatings can be applied to a variety of optical fibers, including those having an optical core comprising a glass optical core and a glass cladding. Suitable optical fibers can include an inner core of relatively high refractive index, and an outer cladding with a lower refractive index than the inner core. The glass optical core can be made of UV photosensitive glass, such as germanosilicate, so that a grating can be written into the glass by UV radiation. The optical fiber is typically from 100 to 150 micrometers in diameter, although other diameters are useful, as will be appreciated by one of ordinary skill in the art. In an embodiment, after the polymer coatings are disposed on the optical fiber and cured, the fiber is subjected to the formation of gratings without coating removal. The cured coating has significant optical transparency at 248 nm, where FBGs are often written. Writing with lasers at other wavelengths is possible, particularly in the UV range, or infrared range. UV-induced gratings can be side-written into the polymer coated fiber without removing the polymer. In a further embodiment, optical fiber having multiple cores within a single cladding structure may also take advantage of this WTC coating combination and grating writing approach.

A first polymer coating can be disposed on and in intimate contact with the optical fiber. A second polymer coating can be disposed on and in intimate contact with the first polymer coating. Optionally, a third polymer coating can be disposed on and in intimate contact with the second polymer coating. The third polymer coating can be an up-buffer coating, which can be used to protect the second polymer coating. Examples of up-buffer coatings include, but are not limited to, poly(ethene-co-tetrafluoroethene (ETFE), fluorinated ethylene propylene (FEP), polyvinylidene fluoride (PVDF), polyether ether ketone (PEEK), and polyfluoroalkoxy (PFA).

As used herein, the term "coating" or "covering" or "layer" or similar terms does not necessarily mean that there is a uniformly thick coating, or that there are no defects, holes, thickness deviations, or other imperfections. Rather, the term "coating" or "covering" or "layer" means that the coating has the desired function, as described herein.

The first polymer coating can comprise repeating units comprising the formula: $R^B-[O-[Si(R^A)_2]_n-R^B$, wherein n is an integer from 1 to 10,000, or from 2,000 to 8,000, or from 5,000 to 7,000; each $R^A$ is independently hydrogen, or an alkyl group having from 1 to 6 carbon atoms, or an alkyl group having from 1 to 3 carbon atoms; and each $R^B$ is independently hydrogen, or an alkyl group having from 1 to 6 carbon atoms, or an alkyl group having from 1 to 3 carbon atoms. In an embodiment, $R^A$ is independently —H, or —$C_xH_{2x+1}$, wherein each x is independently 1 to 6, or independently 1 to 3. In an embodiment, each $R^A$ is —$CH_3$. It is desirable for $R^A$ to not be an aromatic group.

The first polymer coating can be a RTV silicone, including a two-component RTV curing system including a silicone rubber compound and curing agent. The first polymer coating can be RTV615. The first polymer coating can remain flexible at temperatures of −115 to 204° C. The polymer flexibility can be quantified by thermogravimetric analysis (TGA).

The silicone polymer can have a viscosity prior to curing between 3,000 and 7,000 centipoise (cps) at 23° C., preferably between 3,500 and 4,500 cps at 23° C. The first polymer coating can have a thickness on the optical fiber that allows UV light of sufficient intensity to pass through the coating for a desired optical device to be inscribed into the fiber.

The second polymer coating can be any non-silicon containing polymer coating, including, but not limited to an acrylate, aliphatic polyacrylate, silsesquioxane, alkyl substituted silicone, vinyl ether, or a combination comprising at least one of the foregoing. In an embodiment, the second polymer coating comprises a vinyl ether polymer, acrylate polymer, epoxy polymer, or urethane acrylate polymer. In an embodiment, the second coating is a vinyl ether polymer. In an embodiment, vinyl ethers as described in U.S. Pat. No. 5,989,627 can be used. In an embodiment, a UV-curable urethrae acrylate-based polymer coating containing 0.01-0.1% aromatic free-radical generating photo initiator can be used. In an embodiment, the vinyl ether polymer has a number average molecular weight of at least 10,000 grams per mole. In an embodiment, the vinyl ether polymer has a number average molecular weight of 10,000 to 100,000 grams per mole. In an embodiment, the second polymer coating has a hardness of 0.01 to 0.40 gigapascal (GPa), measured by nanoindentation method. In an embodiment, the second polymer coating has a Young's modulus of 0.01 to 4 GPa, at 25° C., as measured by nanoindentation method.

The polymer coatings can be applied to the glass fiber in any suitable manner, such as those known to a person of ordinary skill in the art, including using a draw tower to apply a coating to the glass fiber. The first coating may be applied and cured, after which the second coating may be applied and cured.

The first and second polymer coatings can be cured in any suitable manner, including UV curing or thermal curing. In an example, coatings can be partially cured using UV lamp exposure followed by thermal curing. The coatings can each be functionalized with or contain reactive groups so as to render them UV-curable. The coatings can contain a UV photoinitiator that absorbs sufficient UV radiation to effectively cure the polymer to the desired level, but is relatively transparent to the UV radiation used for writing an optical device. The photoinitiators can be free radical type or cationic type, depending on the identity of the monomers and oligomers forming the polymer coatings. Aromatic free radical photoinitiators are preferably used at 0.01 to 0.2 wt%, based on the total weight of the coating composition. Exemplary aromatic free radical type photoinitiators are IRGACURE 819, IRGACURE TPO, IRGACURE 1173, IRGACURE 4265, and IRGACURE TPO-L (commercially available from BASF). Aliphatic free radical photoinitiators are preferably used at 0.5 to 5 wt%, based on the total weight of the coating composition. Exemplary aliphatic free radical type photoinitiators include adamantyl methyl ketone and pinacolone. Cationic photoinitiators are preferably alkyl-substituted diaryliodonium or alkyl-substituted triarylsulfonium salts. Aromatic cationic photoinitiators are preferably used at 0.03 to 0.1 wt% for vinyl ethers and 0.1 to 1 wt% for epoxies. Exemplary cationic photoinitiators are Irgacure 250 and Irgacure 270 (commercially available from BASF).

Unless otherwise specified, "cured" means fully cured, or cured to a sufficient level (e.g., sufficiently-cured) to have the desired properties, as described herein. When sufficiently-cured, the fiber coatings are sufficiently transparent to ultraviolet radiation so that a desired level of ultraviolet radiation can pass through the fiber coatings to reach the fiber, to write an optical device into the fiber through the coatings, for example. The sufficiently-cured first polymer coatings can have a UV absorbance ranging from 0.01 to 1 (0.0004 to 0.04/micrometers (μm)) at a wavelength of 248 nm, measured on 25 micrometer films between quartz disks. The sufficiently-cured second polymer coatings can have a UV absorbance ranging from 0.2 to 1 (0.008 to 0.04/μm) at a wavelength of 248 nm, measured on 25 micrometer films between quartz disks. When cured, each polymer is substantially devoid of conjugated or unsaturated compounds, for example, aromatic compounds, that absorb UV light. Substantially devoid of conjugated or unsaturated compounds means the polymer does not contain an amount of conjugated or unsaturated compounds that would interfere with the desired characteristics of the polymer.

In an embodiment, the first polymer coating can have a thickness on the optical fiber of between 20 and 80 micrometers, for example. If the first polymer coating is too thin, the handling properties can be adversely affected, for example. If the first polymer coating is too thick, the UV transmission can be adversely affected, for example. In an embodiment, the first polymer coating can have a thickness on the optical fiber of between 50 and 70 micrometers. In an embodiment, the second polymer coating can have a thickness on the optical fiber of between 2 and 35 micrometers. The second polymer coating can have a thickness on the optical fiber of between 5 and 30 micrometers. In an embodiment, the first polymer and second polymer coating have a combined thickness on the optical fiber of between 22 and 115 micrometers. The thickness of the up-buffer coating can be between 100 and 500 micrometers. In general, each coating is present on the optical fiber at a thickness to have the desired performance and physical characteristics, as described herein, but not present in a thickness to prohibit processing of the fiber.

The coatings may each comprise additional monomers or oligomers in addition to the primary component. A coating may contain one or more additives, such as adhesion promotors, thermal stabilizers, flame retardants, antioxidants, UV stabilizers, surface-tension modifying additives, slickness agents, in any useful amount. In an embodiment, a typical amount of an additive is between 0.01 and 1 weight percent of each additive, based on the total weight of the coating.

A method of manufacture of an article having layers is provided, the method comprising: providing an optical fiber; applying a silicone coating precursor to the fiber; curing the silicone coating precursor, to form a silicone polymer coated fiber; applying a second coating precursor to the silicone polymer coated fiber; curing the second coating precursor, to form a second polymer coating; wherein the coatings have an ultraviolet absorption that is sufficiently low so as to allow one or more optical devices to be inscribed into the fiber, in a post coating process, through the coatings, using a phase mask and an ultraviolet laser. Optical devices can also be inscribed into the fiber using other wavelengths, including infrared. The method of manufacture of an article having layers can further comprise writing one or more optical devices into the fiber through the coatings by exposing the fiber to a pattern of ultraviolet radiation corresponding to the optical device. In an embodiment, the optical device is a grating. Methods of writing one or more optical devices into the fiber through the coatings by exposing the fiber to a pattern of ultraviolet radiation corresponding to the optical device are known and described, for example, in U.S. Pat. No. 6,396,983, and 5,620,495, the entire contents of each of which are hereby incorporated by reference.

The coatings and methods have been described for use as optical fiber coatings. However, it is to be understood that the coatings can be used in other applications, such as microelectronic devices and planar waveguides.

This disclosure is further illustrated by the following examples, which are non-limiting.

EXAMPLES

Coating the Fiber

A single mode fused silica optical fiber was used for the examples described here. The WTC used was a UV-curable urethane acrylate-based polymer containing 0.01-0.1 wt% aromatic free-radical generating photoinitiator. The silicone coating used was GE RTV615 Part A & B, from Momentive Performance Materials. The fiber was constructed using the thermally-cured silicone coating as the primary coating, and the UV-cured WTC as a secondary coating. The design parameters used are summarized in Table 1. The fiber cross-section is shown in FIG. 1.

TABLE 1

| Optical properties | |
|---|---|
| Fiber cut off wavelength nanometers (nm) | 1470 |
| Mode field diameter (MFD) @ 1550 nm in micrometers (μm) | 4.71 |
| Numerical aperture | 0.27 |
| Geometry properties | |
| Clad diameter (μm) | 125 |
| Primary coating diameter (μm) | 185 |
| Secondary coating diameter (μm) | 205 |
| Core-clad offset (μm) | <0.5 |
| Clad non-circularity (%) | <2 |
| Mechanical properties | |
| Proof test level in thousand-pound-per-square-inch (Kpsi) | 200 |

Writing Grating on Fiber

Figure 2:
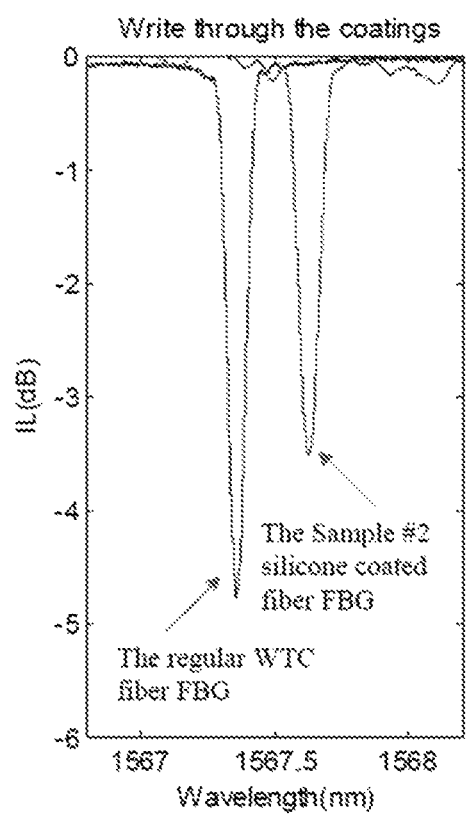
FIG. 2 shows transmission spectra of a silicone/WTC coated fiber with a fiber Bragg grating inscribed (designated as Sample #2) and WTC coated fiber with FBG inscribed (designated as The regular WTC fiber FBG)

A fiber Bragg grating was directly written into the coated fiber using a phase mask and an ultraviolet laser, in contrast to the conventional strip-recoat method. A fiber Bragg grating transmission spectrum for the silicone/WTC coated fiber FBG prepared as described above (sample #2) is shown in FIG. 2. The Peak Insertion loss [IL(dB)] is shown for each coated fiber. Also shown is a transmission spectra of a WTC coated FBG (having 125 μm cladding diameter and 200 μm WTC coating) for comparison purposes. The results show that the transmission spectrum of silicone/WTC coated fiber FBG is comparable to a WTC coated fiber FBG, indicating a comparable UV transparence of silicone/WTC coatings to WTC coated fibers.

Cable Preparation and Testing

Figure 3:
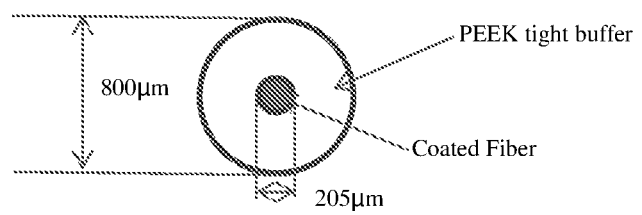
FIG. 3 shows an exemplary cable cross-section (not to scale).

A cable was prepared using tight polyether ether ketone (PEEK) outjacketing (also called up-buffer) applied to a silicone/WTC coated base fiber with gratings written as shown in FIG. 3. An exemplary cable cross section is shown in FIG. 3.

The FBG wavelengths at peak reflectivity before and after the cabling process are summarized in Table 2. Comparing to the FBG wavelengths at peak reflectivity before the cabling process, it can be seen that the FBG wavelengths were uniformly shifted after the PEEK cabling process. The data show the selected outjacketing material, used for the purpose of protecting the second polymer coating after the laser inscription and transferring extrinsic strain, is applying compression to the base fiber after cabling process, leading to a shift in FBG wavelength at peak reflectivity, and the outjacket is applied uniformly along the length, resulting in a uniform shift in FBG wavelengths. The grating reflectivity is not expected to change due to the relatively short processing time.

TABLE 2

FBG wavelengths at peak reflectivity before and after PEEK cabling process

| | Original wavelength after writing (nm) | FBG wavelength after PEEK and with no tension (nm) | Compression induced shift after PEEK process (nm) |
|---|---|---|---|
| 1 | 1534.388 | 1529.997 | −4.391 |
| 2 | 1537.995 | 1533.407 | −4.588 |
| 3 | 1539.765 | 1535.351 | −4.414 |
| 4 | 1542.263 | 1537.586 | −4.677 |
| 5 | 1546.402 | 1541.772 | −4.630 |
| 6 | 1549.375 | 1544.886 | −4.489 |
| 7 | 1552.685 | 1548.333 | −4.352 |
| 8 | 1556.575 | 1552.136 | −4.439 |
| 9 | 1559.495 | 1554.856 | −4.639 |
| 10 | 1562.105 | 1557.459 | −4.646 |
| | | Average | −4.527 |
| | | Minimum | −4.677 |
| | | Maximum | −4.352 |

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiments disclosed.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, or materials that are otherwise not necessary to the achievement of the function or objectives of the compositions, methods, and articles. The singular forms "a," "an," and "the" include plural referents unless the context clearly dictates otherwise. "Or" means "and/or" unless clearly indicated otherwise by context.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. The suffix "(s)" is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not. Unless defined otherwise, technical and scientific terms used herein have the same meaning as is commonly understood by one of skill in the art to which this disclosure belongs.

We claim:

1. An optical fiber having at least two polymer coatings, the optical fiber comprising:
a glass optical core and a glass cladding;
a first polymer coating comprising a silicone polymer covering the optical core; and
a second polymer coating covering the first polymer coating; where the second polymer coating is a write-through coating that is transparent to UV light having a wavelength of 100 nanometers to 400 nanometers; and wherein the first polymer coating has a UV absorbance of 0.01 to 1 at a wavelength of 248 nm, measured on a 25 micrometer thick film located between quartz disks.

2. The optical fiber of claim 1, wherein the first polymer coating is disposed on and in intimate contact with the glass cladding.

3. The optical fiber of claim 1, wherein the second polymer coating comprises a polymer selected from acrylates, aliphatic polyacrylates, silsesquioxanes, alkyl substituted silicones, vinyl ethers, or a combination comprising at least one of the foregoing.

4. The optical fiber of claim 3, wherein the second polymer coating comprises a vinyl ether polymer, acrylate polymer, epoxy polymer, or urethane acrylate polymer.

5. The optical fiber of claim 1, wherein the second polymer coating is a vinyl ether polymer and the vinyl ether polymer has a number average molecular weight of at least 10,000 grams per mole.

6. The optical fiber of claim 1, wherein the first polymer coating has a thickness on the optical fiber of between 20 and 80 micrometers.

7. The optical fiber of claim 1, wherein the second polymer coating has a thickness on the optical fiber of between 2 and 35 micrometers.

8. The optical fiber of claim 1, wherein the first and second polymer coatings have a combined thickness on the optical fiber of between 22 and 115 micrometers.

9. The optical fiber of claim 1, wherein the first polymer coating remains flexible at a temperature from −115 to 204° C., as determined by thermogravimetric analysis.

10. The optical fiber of claim 1, wherein the second polymer coating has a hardness of 0.01 to 0.40 GPa, as measured by nanoindentation method and a Young's modulus of 0.01 to 4 GPa at 25° C., as measured by nanoindentation method.

11. The optical fiber of claim 1, wherein the silicone polymer comprises repeating units comprising the formula:

$$R^B-[O-[Si(R^A)_2]_n-R^B$$

wherein n is an integer from 1 to 10,000; each $R^A$ is independently hydrogen, or an alkyl group having from 1 to 6 carbon atoms; and each $R^B$ is independently hydrogen, an alkyl group having from 1 to 6 carbon atoms.

12. The optical fiber of claim 11, wherein each $R^A$ is independently —H, or —$C_xH_{2x+1}$, wherein each x is independently 1 to 6.

13. The optical fiber of claim 11, wherein each $R^A$ is —$CH_3$.

14. The optical fiber of claim 1, wherein the first and second polymer coatings are UV cured or thermal cured.

15. The optical fiber of claim 1, wherein each polymer coating is transparent to ultraviolet radiation.

16. The optical fiber of claim 1, further comprising a third polymer coating or extruded thermoplastic buffer disposed on and in intimate contact with the second polymer coating.

17. A method of manufacture of an article having layers, comprising:
  providing an optical fiber;
  applying a silicone coating precursor to the fiber;
  curing the silicone coating precursor, to form a silicone polymer coated fiber; wherein the silicone polymer has a UV absorbance of 0.01 to 1 at a wavelength of 248 nm, measured on a 25 micrometer thick film located between quartz disks;
  applying a second coating precursor around the silicone polymer coated fiber;
  curing the second coating precursor, to form a second polymer coating; wherein the polymer coatings have an ultraviolet absorption that is sufficiently low so as to allow one or more optical devices to be inscribed into the fiber, in a post coating process, through the coatings, using an ultraviolet laser; where the second polymer coating is a write-through coating that is transparent to UV light having a wavelength of 100 nanometers to 400 nanometers.

18. The method of claim 17, further comprising writing one or more optical devices into the fiber through the coatings by exposing the fiber to a pattern of ultraviolet radiation corresponding to the optical device.

19. The method of claim 18, wherein the optical device is a grating.

20. An optical fiber manufactured according to the method of claim 17.

21. The optical fiber of claim 16, wherein the third polymer coating or the extruded thermoplastic buffer comprises polyether ether ketone, poly(ethene-co-tetrafluoroethene), fluorinated ethylene propylene, polyvinylidene fluoride, and polyfluoroalkoxy.

22. The optical fiber of claim 1, wherein the second polymer coating has a UV absorbance ranging from 0.2 to 1 at a wavelength of 248 nm, measured on a 25 micrometer film of the second polymer coating located between quartz disks.

23. The optical fiber of claim 1, where the silicone polymer has a viscosity prior to curing of between 3,500 and 4,500 cps at 23° C.

24. The optical fiber of claim 1, where the first polymer and the second polymer when cured are devoid of conjugated and unsaturated compounds.

25. The optical fiber of claim 1, where the first polymer and the second polymer are devoid of aromatic compounds.

* * * * *